Dec. 2, 1969  H. CORSEPIUS ET AL  3,481,969

PROCESS FOR THE PRODUCTION OF ADIPONITRILE

Filed June 14, 1966

INVENTOR
HORST CORSEPIUS
FRIEDRICH BENDE

BY McCarthy, Depaoli & O'Brien
ATTORNEYS

United States Patent Office 3,481,969
Patented Dec. 2, 1969

3,481,969
PROCESS FOR THE PRODUCTION OF ADIPONITRILE
Horst Corsepius, Frankfurt, and Friedrich Bende, Bergen-Enkheim, Germany, assignors to Vickers-Zimmer Aktiengesellschaft Planung und Bau von Industrieanlagen, Frankfurt am Main, Germany, a corporation of Germany
Filed June 14, 1966, Ser. No. 557,439
Int. Cl. C07c 121/10
U.S. Cl. 260—465.2
4 Claims

ABSTRACT OF THE DISCLOSURE

A process for the production of adiponitrile which comprises contacting molten adipic acid with ammonia vapor to provide a mixture of ammonia and adipic acid vapors having a temperature of about 360° to 380° C. and containing about 15–30 mols of ammonia per mol of adipic acid, passing this mixture through a reactor containing a solid dehydration catalyst and recovering the adiponitrile produced therein.

---

This invention pertains to the production of adiponitrile from adipic acid and ammonia and, in particular, is concerned with a method of maximizing the yield of the desired end product. The art has concerned itself for some time with procedures for reacting ammonia with adipic acid but has encountered problems which up to this time have not been solved. Since adiponitrile is an intermediate in the commercial production of nylon, any improvement in yield of nitrile from the feed materials is of widespread economic interest.

One of the problems associated with adipic acid conversion to the nitrile is the unwanted production of tarry by-products. Not only do these polymerized degradation products represent a net loss in yield, but also they tend to deposit in and plug the equipment used in conventional procedures. For example, U.S. Patent 2,955,130 reports that 3 percent of the adipic acid fed in its process is converted to an unusable brownish powder.

Figure 1:
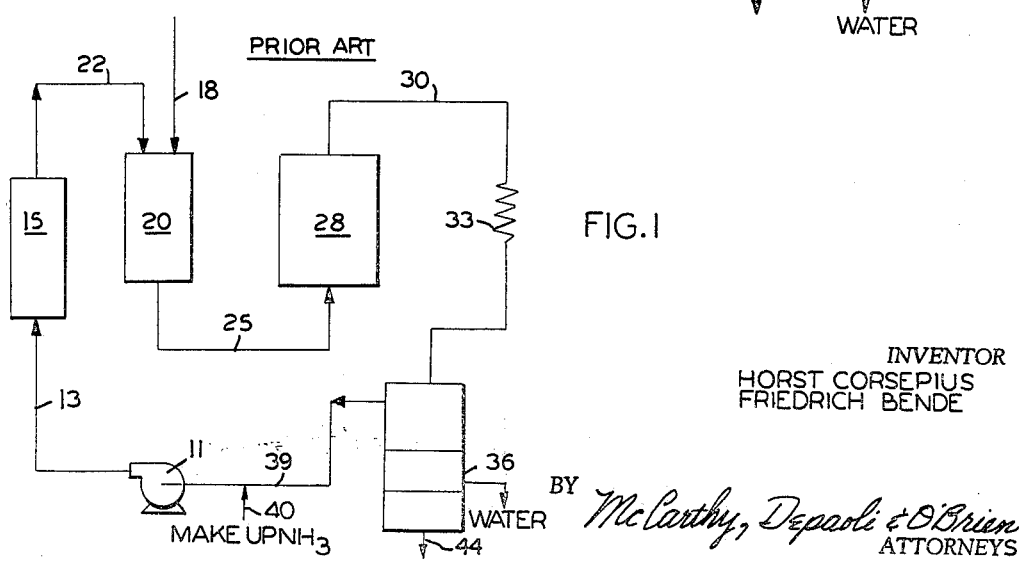

An understanding of prior art processes for adiponitrile production may be obtained from a consideration of FIG. 1 of the enclosed drawing which is a schematic representation of a system commercially used for adiponitrile production. In this system ammonia at about 20° C. and 1000 normal cubic meters per hour is passed by pump 11 and line 13 to the heater 15 where its temperature is raised to about 430° C. to 450° C., usually by means of electrical windings on the heater. Molten adipic acid at about 160° C. and at a rate of 130 kilograms per hour is passed by line 18 to the evaporator 20 where it is usually spread out in a thin film, either on the walls of the evaporator or on a packing material, such as Raschig rings contained therein. The high temperature ammonia conducted to the evaporator 20 by line 22 serves to vaporize and/or entrain the adipic acid. In prior art procedures it is usual to use about 35–50 or more moles of ammonia per mole of adipic acid fed to the evaporator. The vapor mixture, at a temperature of about 360° C., passes by line 25, usually referred to as a "bridge," to the reactor 28 which usually contains a dehydration catalyst. Usually one liter of catalyst can process about 0.022 kilogram of adiponitrile per hour. At the flow rates mentioned, about 50 moles of $NH_3$ are provided for each mole of adipic acid and this excess ammonia sweeps the formed adiponitrile vapor from the reactor 28 at a temperature of about 310° C. through the line 30 and cooler 33 to the fractionation column 36. Ammonia vapors are removed from the column 36 by line 39 for recycle to the evaporator. Make-up ammonia is added to the system via line 40. The adiponitrile, which usually amounts to about 80.4% of theory yield, is removed, along with water, by line 44. Cooler 33 may chill the mixture to about room temperature. Quick cooling is necessary to prevent unwanted side reactions.

Despite the precautions used in this typical prior art procedure, the evaporator is found to plug by tars after about 5 days of operation. Also, the ammonia heating operation in heater 15 is found to be severely expensive. Moreover, when the ammonia is heated up over 430° C. there is always the possibility of decomposition.

In the method of this invention the production of tarry by-products is minimized while less heating costs are involved and less ammonia needs to be employed. This gives an increased yield which may be raised still further by using an improved reaction procedure.

In this invention ammonia, heated to only about 360° C. to 380° C. is fed to a wiped film evaporator which is externally heated to maintain a temperature of about 350° C.–380° C. Only about 15–30 moles of ammonia need to be fed per mole of adipic acid. The evaporator is provided at its bottom with a reservoir suitable for containing a liquid and the processing conditions are so arranged that about 1% of the adipic acid fed to the evaporator is not evaporated, but rather carries any tars produced in the reaction to the bottom of the evaporator whence they may be conveniently withdrawn. The reservoir is heated and may be kept at a temperature below that at which there is significant conversion of adipic acid in the mixture to unusable products. The withdrawn mixture of adipic acid and tars may, of course, be treated for adipic acid recovery by, for example, the use of a suitable solvent, such as water.

Adipic acid is fed to the evaporator, usually at a temperature just above its melting point. Advantageously, the adipic acid is fed to about the mid-point or upper part of the evaporator while the ammonia stream is about evenly divided and fed to a lower and an upper portion of the evaporator. Heat for the evaporator may be supplied by any convenient means. It has been found advantageous to heat the evaporator by means of an external Dowtherm heating jacket whereby the desired temperature of about 350° C.–380° C. is maintained.

The ammonia vapors having adipic materials dissolved or entrained therein is conducted to a tubular reactor where it is passed, usually downwardly, through narrow tubes filled with a dehydration catalyst. This catalyst may advantageously be phosphoric acid distended on a silica gel support. Other catalysts are known which also may be employed. The vapor mixture is introduced to the reactor at a temperature greater than 300° C., preferably about 340° C.–360° C., and also is removed from the reactor at a temperature greater than about 300° C. and usually at slightly greater than atmospheric pressure. The space velocity of the vapor mixture will generally be about 7.5–45 gram moles of the ammonia plus adipic material per liter of catalyst per hour, preferably about 15–30 gram moles. A space velocity of about 25 grams moles is most preferred. The residence time of the adipic material in the reactor often is about 4 seconds. Ideally, the ratio of the length of the tubular reactors to their diameter will be about 66 to 666 to 1 and enough tubes will be supplied to handle the amount of the charge at the residence time desired. The tubes preferably are about 4–10 meters long with a diameter of 15–60 millimeters. By the use of a system having 12 tubes, each about 6 meters long and 32 millimeters in diameter, about 5.0–9.0 kilograms of adiponitrile can be produced per hour, the residence time of the adipic material in the reactor being about 4 seconds.

After leaving the reactor the mixture, comprising primarily ammonia, adiponitrile and water is cooled to about 20° C. and separated into its components. The ammonia is recycled to the evaporation step.

Figure 2:
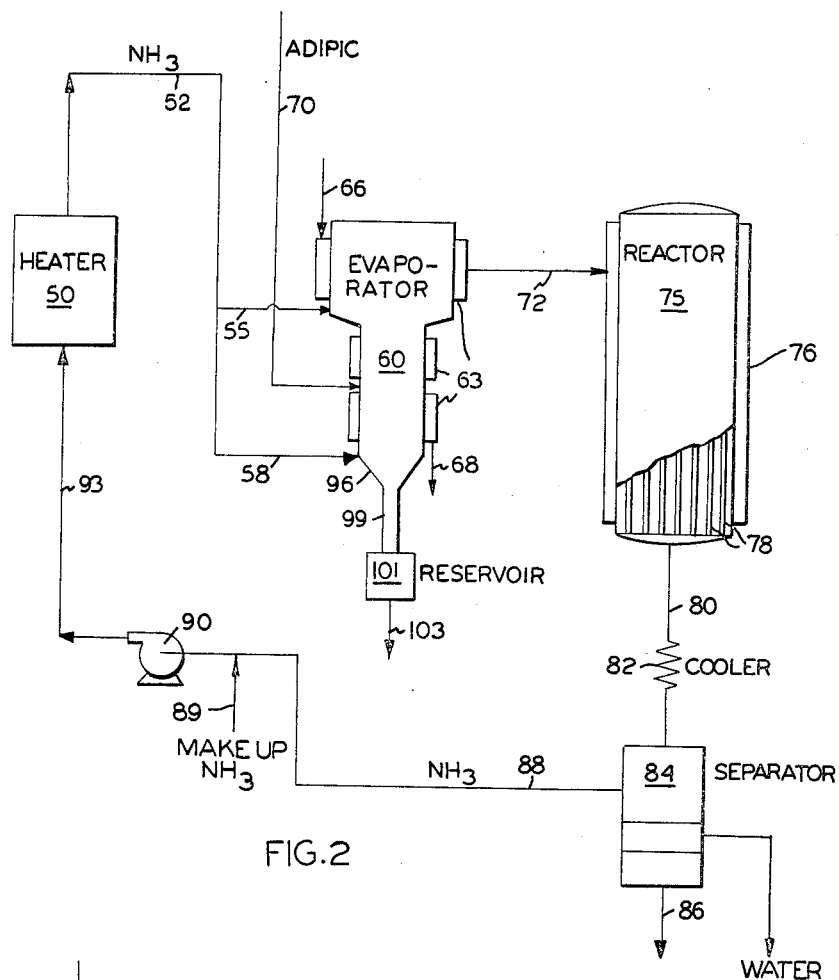

FIG. 2 of the drawings is a schematic representation of the process of this invention. Ammonia vapor is heated in the heater 50 and conducted by lines 52, 55 and 58 to the evaporator 60. As can be seen line 55 carries ammonia to a top portion of the evaporator 60 while line 58 conducts it to a lower portion, and the evaporator is provided with the heating jacket 63. Associated with the heating jacket 63 are the hot fluid inlet 66 and the cooled fluid outlet 68. Line 70 conducts molten adipic acid to the mid-section of the evaporator 60 where the adipic acid can spread out along the walls of the evaporator in a thin film where it is contacted by and entrained in the ammonia vapors. The evaporator may be provided with mechanical means, for example, rotating wiper blades, to spread the adipic acid out on the inner wall surface in a thin film to insure rapid vaporization. The vapor mixture is conducted by bridge 72 to reactor 75 which, as shown, may be provided with the catalyst-filled tubes 78. Line 80 conducts the reaction product to the cooler 82 and thence to the separator chamber 84. Line 86 conducts the crude adiponitrile together with the reaction water to further processing and recovering operations while line 88 removes ammonia vapor to the pump 90 and back to the heater 50 by means of the line 93. Make-up ammonia can be added to the system via line 89.

Evaporator 60, as shown, is provided with the tapering bottom portion 96 which leads by way of line 99 to the heated reservoir 101 wherein tarry materials washed down from the walls of the evaporator by molten adipic acid may accumulate until being drawn off by line 103.

The invention will be better understood by the following examples of the process of this invention which should be considered illustrative only and not limiting.

EXAMPLE I

Adipic acid, 7.35 kilograms/hour, was fed to a wiped film evaporator having an internal surface area of 0.07 square meter. The temperature of the evaporator varied from end to end from 345° C.–380° C. and 17.6 gram moles of NH₃ were fed at about 360° C. to the evaporator for each gram mole of adipic acid. About 3.25 percent of the adipic acid fed to the evaporator went to the reservoir as adipic acid or tars. The vapor mixture was conducted at 342° C. to a tubular reactor provided with a Dowtherm heating jacket and having twelve tubes 32 millimeters in diameter. Eleven of these tubes were filled to a depth of about 181 times the diameter of the tube with a catalyst comprising phosphoric acid on silica gel, and the remaining tube was filled sufficiently to provide about 55 liters of catalyst in all. This amounted to 7.5 liters per kilogram of adipic materials fed per hour or 16.9 gram moles total ammonia and adipic material per liter of catalyst per hour. The exit temperature from the reactor was about 350° C. and the pressure change from top to bottom of the reactor was 0.5 atmosphere. The yield of adiponitrile was 91.4% based on the adipic acid fed.

EXAMPLES II AND III

Further runs were conducted using variations in the ratio of ammonia to adipic acid, in number of tubes and their ratio of length to diameter, etc. These examples are presented in Table I below which also reports a run A according to prior art procedures. Each example, except A, used 55 liters of catalysts in the reactor.

TABLE I

| Example | I | II | III | A |
|---|---|---|---|---|
| Evaporator: | | | | |
| Wet Film [surface area (m.²)] | 0.07 | 0.07 | 0.07 | |
| Packed [liters] | | | | 1,000 |
| Temperature (° C.) | 345–380 | 345–380 | 333–383 | 360–430 |
| NH₃ Feed: | | | | |
| Temperature | 360 | 360 | 368 | 430 |
| Moles/Mole Adipic | 17.6 | 20.2 | 27.8 | 45 |
| Adipic Acid Feed: | | | | |
| Kg./hr | 7.35 | 7.5 | 6.52 | 135.3 |
| Kg./liter packing/hr | | | | 0.135 |
| Adipic plus tars from evap. (wt. percent) | 3.25 | 2.2 | 2.6 | |
| Bridge (evap. to react.) temp | 342 | 338 | 335 | 360 |
| Reactor: | | | | |
| Single tube diam. (mm.) | 32 | 100 | 60 | 1,400 |
| Ratio length/diam | 181 | 58 | 97 | 1.7 |
| Number of tubes | 11 | 1 | 3 | 1 |
| Catalyst vol. (liters) | 55 | 55 | 55 | 3,660 |
| Catalyst vol. (liters/kg./Adipic/hr.) | 7.5 | 7.3 | 8.4 | 27 |
| Temperature: | | | | |
| Inlet | 342 | 343 | 339 | 360 |
| Outlet | 350 | 325 | 353 | 310 |
| Pressure Change (atm. gauge) | 0.5 | 0.3 | 0.3 | 0.3 |
| Gram Moles Adipic plus NH₃/liter catalyst/hr | 16.9 | 18.8 | 23.4 | 14 |
| Yield (mole percent) | 91.4 | 86.5 | 90.2 | 80.3 |

These data show the improved yields of adiponitrile which can be obtained using the process of this invention, especially when the reactor provides for flow of the reactants through elongated tubes. Examples I through III show that better conversion using far less catalyst may be achieved in this manner.

What is claimed is:

1. A process for the production of adiponitrile by the reaction of ammonia and adipic acid which comprises spreading molten adipic acid on the interior walls of an externally heated vessel at a temperature of about 350° to 380° C. to form a film on said walls, passing a stream of ammonia vapor, heated at a temperature of about 360° to 380° C., over the film in an amount to provide a mixture of ammonia and adipic acid vapors containing about 15 to 30 gram moles of ammonia per gram mole of adipic acid, wherein all but about 1 percent of the adipic acid therein is evaporated, collecting said 1 percent of liquid adipic acid with tarry materials therein from the bottom of said vessel, and passing the ammonia/adipic acid vapor mixture through a reactor containing a phosphoric acid dehydration catalyst at a temperature of about 300° to 360° C.

2. A process according to claim 1 wherein the ammonia/adipic acid vapor mixture is passed to said reactor at a temperature of about 340° to 360° C.

3. A process according to claim 2 wherein the space velocity in said reactor is about 7.5 to 45 gram moles of the ammonia plus adipic material per liter of catalyst per hour.

4. A process according to claim 3 wherein the catalyst in said reactor is phosphoric acid supported on silica gel.

References Cited

UNITED STATES PATENTS

| | | | |
|---|---|---|---|
| 3,142,696 | 7/1964 | Mihara et al. | 260—465.2 |
| 3,325,532 | 6/1967 | Rushton et al. | 260—465.2 |
| 3,360,541 | 12/1967 | Korchinsky et al. | 260—465.2 |
| 3,393,222 | 7/1968 | Schwarz et al. | 260—465.2 |
| 2,314,894 | 3/1943 | Potts et al. | 260—465.2 X |
| 2,414,393 | 1/1947 | Potts et al. | 260—465.2 X |
| 2,448,275 | 8/1948 | Potts et al. | 260—465.2 |
| 2,830,072 | 8/1958 | Garritsen et al. | |
| 2,955,130 | 10/1960 | Guyer et al. | 260—465.2 |
| 3,153,084 | 10/1964 | Veazey et al. | 260—465.2 |
| 3,299,116 | 1/1967 | Romani et al. | 260—465.2 |

FOREIGN PATENTS 877,664  9/1961  Great Britain.

CHARLES B. PARKER, Primary Examiner

S. T. LAWRENCE III, Assistant Examiner

U.S. Cl. X.R.

260—561